(12) United States Patent
Thalappil et al.

(10) Patent No.: US 9,494,517 B2
(45) Date of Patent: Nov. 15, 2016

(54) GOLD AND SILVER QUANTUM CLUSTERS IN MOLECULAR CONTAINERS AND METHODS FOR THEIR PREPARATION AND USE

(71) Applicant: INDIAN INSTITUTE OF TECHNOLOGY MADRAS, Chennai, Tamil Nadu (IN)

(72) Inventors: Pradeep Thalappil, Chennai (IN); Shibu Sidharth Edakkattuparambil, Kerala (IN)

(73) Assignee: INDIAN INSTITUTE OF TECHNOLOGY MADRAS, Chennai (IN)

( * ) Notice: Subject to any disclaimer, the term of this patent is extended or adjusted under 35 U.S.C. 154(b) by 21 days.

(21) Appl. No.: 14/617,290

(22) Filed: Feb. 9, 2015

(65) Prior Publication Data
US 2015/0153280 A1 Jun. 4, 2015

Related U.S. Application Data

(63) Continuation of application No. 13/504,440, filed as application No. PCT/IB2011/000260 on Feb. 14, 2011, now Pat. No. 8,999,717.

(30) Foreign Application Priority Data

Dec. 30, 2010 (IN) .......................... 4036/CHE/2010

(51) Int. Cl.
*C09K 11/58* (2006.01)
*C09K 11/02* (2006.01)
(Continued)

(52) U.S. Cl.
CPC ........... *G01N 21/6447* (2013.01); *B42D 25/29* (2014.10); *B82Y 10/00* (2013.01);
(Continued)

(58) Field of Classification Search
CPC ............ G01N 21/6447; G01N 21/64; C09K 11/025; C09K 11/58
See application file for complete search history.

(56) References Cited

U.S. PATENT DOCUMENTS 7,030,176 B2    4/2006    Nohr et al.
7,371,456 B2    5/2008    Nohr et al.
(Continued)

FOREIGN PATENT DOCUMENTS

JP    2002-087810    3/2002
JP    2003-221442    8/2003
(Continued)

OTHER PUBLICATIONS

Glutathione Protected Gold Clusters Revisited: Bridging the Gap between Gold-Thiolate Complexes and Thiolate-Protected Gold Nanocrystals. Yuichi Negishi, Katsuyuki Nobusada, and Tatsuya Tsukuda J. Am. Chem Soc. 2005, 127, 5261-5270.*
(Continued)

*Primary Examiner* — Krishnan S Menon
*Assistant Examiner* — Dwan A Gerido
(74) *Attorney, Agent, or Firm* — Foley & Lardner LLP

(57) ABSTRACT

A composition includes a quantum cluster of $Ag_m$ or $Au_n$, one or more protector molecules; and a molecular cavity partially or wholly surrounding the quantum cluster. A method for preparing the quantum clusters includes adding a first amount of glutathione to a gold salt, a silver salt, or a mixture thereof to form a mixture; adding a reducing agent to the mixture to form a precipitate; and mixing the precipitate with a second amount of glutathione and a cyclodextrin to form a composition. Devices are prepared from the quantum clusters, and the devices may be used in methods of authentication of articles.

20 Claims, 11 Drawing Sheets

(51) Int. Cl.

| | | |
|---|---|---|
| *G01N 21/64* | (2006.01) | |
| *B82Y 30/00* | (2011.01) | |
| *G07D 7/14* | (2006.01) | |
| *B82Y 10/00* | (2011.01) | |
| *B42D 25/29* | (2014.01) | |
| *B42D 25/387* | (2014.01) | |

(52) U.S. Cl.
CPC ............ *B82Y 30/00* (2013.01); *C09K 11/025* (2013.01); *C09K 11/58* (2013.01); *G07D 7/14* (2013.01); *B42D 25/387* (2014.10); *B42D 2033/20* (2013.01); *B42D 2035/34* (2013.01); *Y10T 428/30* (2015.01); *Y10T 428/31634* (2015.04); *Y10T 428/31971* (2015.04); *Y10T 428/31978* (2015.04)

(56) References Cited

U.S. PATENT DOCUMENTS

| | | | |
|---|---|---|---|
| 2005/0153071 A1* | 7/2005 | Bouvrette | ............ B01J 35/0013 427/212 |
| 2009/0035852 A1 | 2/2009 | Lopez Quintela et al. | |

FOREIGN PATENT DOCUMENTS

| | | |
|---|---|---|
| JP | 2004-530027 | 9/2004 |
| JP | 2005-531577 | 10/2005 |
| JP | 2009-507996 | 2/2009 |
| JP | 2010-502654 | 1/2010 |
| WO | WO-02/098998 | 12/2002 |
| WO | WO-2004/076531 | 9/2004 |
| WO | WO-2010/016803 | 2/2010 |

OTHER PUBLICATIONS

Subnanometer-sized Gold Clusters with Dual Molecular Receptors: Synthesis and Assembly in One-dimensional Arrangements. Yuichi Negishi, Hironori Tsunoyama, Yasushi Yanagimoto, and Tatsuya Tsukuda Chemistry Letters vol. 34, No. 12 (2005).*

Final Office Action in U.S. Appl. No. 13/504,440 dtd Oct. 9, 2013 (7 pages).

International Preliminary Report on Patentability for Intl. Pat. Appln. No. PCT/IB2011/000260, issued on Jul. 2, 2013, 6 pages.

International Search Report and Written Opinion for PCT/IB2011/000260 mailed May 25, 2011.

Klajn, R. et al., "Writing self-erasing images using metastable nanoparticle "inks"," Angew. Chem. Int. Ed. Engl., 2009, vol. 48, pp. 7035-7039.

Link, S. et al., "Visible to Infrared Luminescence from a 28-Atom Gold Cluster," J. Phys. Chem. B, 2002, vol. 106, pp. 3410-3415.

Muhammed, M.A.H. et al., "Luminescent quantum clusters of gold in bulk by albumin-induced core etching of nanoparticles: Metal ion sensing, metal enhanced luminescence and biolabeling," Chem. Eur. J., 2010, vol. 16, pp. 10103-10112.

Negishi, et al., "Glutathione-protected gold clusters revisited: bridging the gap between gold(I)-thiolate complexes and thiolate-protected gold nanocrystals," J Am Chem Soc., 127(14), 2005, pp. 5261-5270.

Negishi, et al., "Subnanometer-sized gold clusters with dual molecular receptors: synthesis and assembly in one-dimensional arrangements," The Chemical Society of Japan, Chemistry Letters, vol. 34, No. 12, 2005, pp. 1638-1639.

Non-Final Office Action in U.S. Appl. No. 13/504,440 dtd Jun. 10, 2014 (7 pages).

Non-Final Office Action in U.S. Appl. No. 13/504,440 dtd Jun. 4, 2013 (7 pages).

Notice of Allowance in U.S. Appl. No. 13/504,440 dtd Nov. 3, 2014 (5 pages).

Paau, M.C. et al., "Synthesis of 1.4 nm α-Cyclodextrin-Protected Gold Nanoparticles for Luminescence Sensing of Mercury(II) with Picomolar Detection Limit," J. Phys. Chem. C, 2010, vol. 114, pp. 15995-16003.

Schmid, G. et al., "A New Approach to Well-Ordered Quantum Dots," Eur. J. Inorg. Chem., 2000, pp. 835-837.

Schmid, G. et al., "The behavior of $Au_{55}$ nanoclusters on and in thiol-terminated dendrimer monolayers," Small, 2005, vol. 1, No. 1, pp. 73-75.

Shibu, E.S. et al., "Quantum Clusters in Cavities: Trapped Au15 in Cyclodextrins," Chem. Mater., 2011, vol. 23, pp. 989-999.

Simms, G.A. et al., "Structural and electronic properties of protein/thiolate-protected gold nanocluster with "staple" motif: A XAS, L-DOS, and XPS study," J. Chem. Phys., 2009, vol. 131, pp. 214703-1-214703-9.

Xerox, Experimental Xerox Paper Erases Itself, Results in Temporary Documents on Reusable Paper, printed on Jul. 19, 2011, retrieved from the internet (http://www.xerox.com/innovation/exp_paper.shtml) 1 page.

* cited by examiner

GOLD AND SILVER QUANTUM CLUSTERS IN MOLECULAR CONTAINERS AND METHODS FOR THEIR PREPARATION AND USE

CROSS-REFERENCE TO RELATED APPLICATIONS

This application is a continuation under 35 U.S.C. §120 of U.S. application Ser. No. 13/504,440, now U.S. Pat. No. 8,999,717, filed on Sep. 20, 2012, which is a U.S. national stage application of International Application No. PCT/IB2011/000260, filed on Feb. 14, 2011, which in turn claims the benefit of India Patent Application No. 4036/CHE/2010, filed on Dec. 30, 2010, each of which is incorporated herein by reference in its entirety for any and all purposes.

FIELD

The present technology generally relates to quantum clusters. In particular, the present technology refers to quantum clusters made of gold or silver.

BACKGROUND

Quantum clusters are materials having very few atoms; with core sizes in the sub-nanometer range and which exhibit novel properties. Compared to metal nanoparticles, quantum clusters do not have a continuous density of states but are characterized by discrete electronic energy levels. Quantum clusters act as a bridge between atomic and nanoparticle behaviors and therefore exhibit properties different from both these.

SUMMARY

In one aspect, a composition is provided including a quantum cluster with $Ag_m$, $Au_n$, or $Ag_mAu_n$ where m and n are from 2 to 100, one or more protector molecules and a molecular cavity partially or wholly surrounding the quantum cluster. In some embodiments, the protector molecule is a thiol. In some embodiments, thiol is glutathione, cysteine, mercaptosuccinic acid, dimercaptosuccinic acid, phenylethane thiol and other aliphatic and aromatic thiols. In some embodiments, the molecular cavity includes a cyclodextrin, calixarene, or a crown ether.

In some embodiments, the composition is luminescent. In some embodiments, the luminescence of the composition is medium-dependent, liquid-solvent dependent or solvent vapor-dependent.

In one aspect, a method is provided including adding a first amount of glutathione to a gold salt, a silver salt, or a mixture thereof to form a mixture. The method includes adding a reducing agent to the mixture to form a precipitate, and mixing the precipitate with a second amount of glutathione and a cyclodextrin to form a composition. In some embodiments, the method includes having a molar ratio of the first amount of glutathione to the amount of the gold salt, the silver salt, or the mixture thereof of from about 1:2 to about 1:8. In some embodiments, the precipitate comprises a) a quantum cluster of, $Ag_m$, $Au_n$, or $Ag_mAu_n$; and b) glutathione, where m and n are independently from 2 to 100. In some embodiments, m and n are from 2 to 50. In some other embodiments, m and n are independently from 10 to 40. In some embodiments, the gold salt is a trivalent gold source. In some embodiments, the gold salt is $HAuCl_4 \cdot 3H_2O$, $AuCl_3$, or a mixture thereof. In some embodiments, the reducing agent is $NaBH_4$, $LiBH_4$, or a mixture thereof.

In one aspect, a device is provided with a substrate; and a composition coated on the substrate; where the composition includes a quantum cluster, a protector compound, and a molecular cavity and the device exhibits solvent-dependent luminescence when exposed to a liquid solvent or a solvent vapor. In some embodiments, the substrate comprises $SiO_2$, glass, conducting glass, quartz, silicon, or functionalized polymers.

In one aspect, a method is provided including the steps of: providing a substrate coated with a composition comprising a quantum cluster, a protector compound, and a molecular cavity; exposing the substrate to a first solvent; where the first solvent induces a luminescent response from the composition; the composition is coated on the substrate in a pattern; and the first solvent comprises a liquid solvent or solvent vapor. In some embodiments, the methods include removing the first solvent, wherein the composition does not luminesce, or exhibits a luminescence of reduced intensity, after the first solvent is removed. In some embodiments, removing the solvent includes exposing the substrate to a second solvent, wherein the second solvent does not produce a luminescent response from the composition, and contacting the substrate with the second solvent quenches the luminescent response induced by the first solvent. In some embodiments, the removing includes allowing the first solvent to evaporate from the substrate. The method can further comprise detecting the presence or absence of the luminescent response.

In one aspect, a composition is provided with a core comprising 15 Au atoms, one or more glutathione molecules, and one or more cyclodextrin molecules wherein the cyclodextrin molecules at least partially surround the Au atoms. In some embodiments, two molecules of cyclodextrin partially or wholly surround the Au atoms. In some embodiments, the cyclodextrin is α-, β-, or γ-cyclodextrin.

In one aspect, a labeling system is provided including a substrate having a coating comprising a quantum cluster, a protector compound, and a molecular cavity. The coating on the substrate is in a pattern and the pattern is luminescent when exposed to solvent. The labeling system includes a means for detecting the pattern on the substrate. In some embodiments, the pattern includes letters, numbers, symbols, pictures, or barcodes. In some embodiments, the substrate is attached to currency, financial and legal documents, shipping containers, electronics, medical device, pharmaceutical packaging, packaging on consumer items or biological compounds.

In one aspect, a method of authentication is provided including exposing a patterned coating to a solvent and detecting the patterned coating. In some embodiments, the coating includes a quantum cluster, a protector compound, and a molecular cavity. In some embodiments, the coating is luminescent when exposed to the solvent and luminescence intensity is reduced when the solvent is removed. In some embodiments, the patterned coating encodes the authenticity of an object to which the coating is applied. In some embodiments, the patterned coating comprises letters, numbers, symbols, pictures, or barcodes. In some embodiments, the object is currency, a financial document, a legal document, a shipping container, an electronic object, an envelope, or packaging. The method can include detecting the presence or absence of the patterned coating on the object. In some embodiments, the method includes verifying authenticity of the object by correlating the presence of the patterned coating with authenticity of the object.

DETAILED DESCRIPTION

Figure 1:
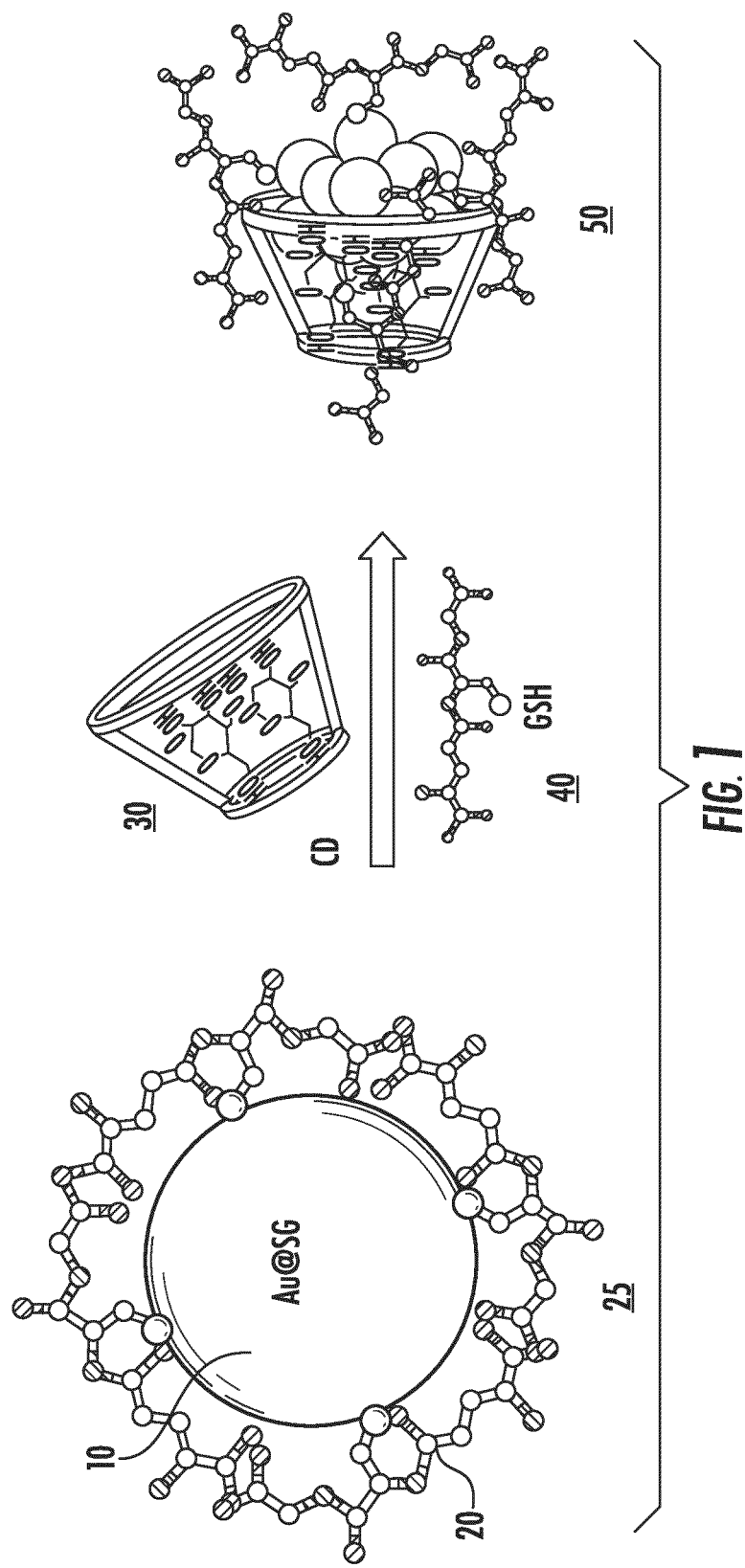
FIG. 1 is a schematic of the process for making the cluster composition, according to one embodiment.

In the following detailed description, reference is made to the accompanying drawings, which form a part thereof. The illustrative embodiments described in the detailed description, drawings and claims are not meant to be limiting. Other embodiments may be utilized, and other changes may be made, without departing from the spirit or scope of the subject matter presented here. The present technology is also illustrated by the examples herein, which should not be construed as limiting in any way.

In general, compositions are provided which include $Ag_m$, $Au_n$, or $Ag_mAu_n$ quantum clusters are provided by combining host-guest chemistry with core-etching. Such compositions exhibit luminescence that is dependent upon the environment in which the quantum cluster is located. Such compositions may also be useful in authentification processes. The compositions, devices, and methods are all described in greater detail below. As used herein, "core etching" refers to treatment of the metal quantum clusters with excess of protector molecules. As used herein, "host-guest chemistry" refers to partial or whole containment of the metal quantum clusters in the molecular cavity.

In one aspect, compositions including $Ag_m$, $Au_n$, or $Ag_mAu_n$ quantum clusters are provided. In some embodiments, the composition includes one or more protector molecules surrounding the metal atoms, and m and n are from 2 to 100. In some embodiments, n is from 5 to 50, or from 10 to 20. In some embodiments, n is 15. Specific examples of n include 2, 3, 4, 5, 10, 15, 20, 25, 30, 40, 50, 60, 70, 80, 90, 100, and ranges between any two of these values. In some embodiments, the quantum cluster comprises $Au_g$. In other embodiments, the quantum cluster comprises $Ag_m$.

In some embodiments, the protector molecule is a thiol. The protector molecule can bind to the surface of the quantum cluster, thereby forming a layer partially or fully around the cluster and protecting the cluster. In some embodiments, the protector molecules may include glutathione (GSH), cysteine, homocysteine, mercaptosuccinic acid, dimercaptosuccinic acid, phenylethane thiol, or other alkyl or aryl thiols. Generally, where the protector molecule is a mono thiol, it will reduce the $Au^{3+}$ to $Au^{1+}$. Further reduction may be carried out by the addition of a reducing agent. In contrast, where the protector molecule is a dithiol, for example the dimercaptosuccinic acid, one of the thiol groups will act as reducing agent (i.e. one of the groups is oxidized) and the other will act as a protecting agent (i.e. it is reduced). In some embodiments, the protector molecule is a reduced form of the protector molecule; such as reduced glutathione. Clusters of Au atoms with the glutathione ligand (-SG) may be represented as Au@SG for convenience.

In some embodiments, a molecular cavity partially or wholly surrounds the metal cluster with the protector molecule, e.g., Au@SG. Such molecular cavities may include one or more molecules of cyclodextrin, calixarene, or a crown ether. In addition, it may be possible to create cluster compositions within other molecular cavities such as PAMAM, BSA, and the like.

Cyclodextrins are a family of compounds made up of sugar molecules bound together in a ring. In some embodiments, $\alpha$-, $\beta$-, or $\gamma$-cyclodextrin ($\alpha$-, $\beta$-, or $\gamma$-CD) molecules are used to form the cluster composition represented as $Au@\alpha CD$, $Au_{15}@\beta CD$ or $Au_{15}@\gamma CD$. Cyclodextrins are bowl-shaped molecules which may "trap" or "encapsulate" other molecules of an appropriate size which will fit into the bowl.

As noted, the above compositions exhibit luminescence. Such luminescence may be medium-dependent, liquid solvent-dependent, or solvent vapor-dependent. For example, when the composition is exposed to some media, the luminescence is increased. In some embodiments, the solvent is, but not limited to, an alcohol, methanol, ethanol, or propanol; water; acetonitrile; acetone; dichloromethane; carbon tetrachloride; chloroform; toluene; hexane; or a mixture of any two or more thereof. In some cases, it is observed that the more hydrogen bonding between the cluster ligands and the solvent, the greater the luminescence. Accordingly, the luminescence of the composition in the presence of either methanol or ethanol is greater than that for propanol. In some embodiments, where the composition is placed in water, luminescent emission at 318 nm, 458 nm and 580 nm is observed.

In another aspect a method of preparing the compositions is provided. In one embodiment, a gold or silver salt is mixed with the thiol protector molecule to precipitate a protected metal cluster. In some embodiments, where it is a gold slat that is used, and the protector molecule is glutathione, the cluster particles (referred to as Au@SG) may be precipitated from the mixture in the presence of a reducing agent. It is understood that gold salts such as $HAuCl_4 \cdot 3H_2O$, $AuCl_3$, or other trivalent gold salts may be used in the methods. Suitable reducing agents include, but are not limited to $NaBH_4$ and $LiBH_4$, as well as other known reducing agents, or a mixture of any two or more reducing agents. In some embodiments, the amount of gold or silver salt to protector molecule ranges from about 1:2 to about 1:8. In other embodiments, the metal cluster has formula $Ag_m$, $Au_n$, or $Ag_mAu_n$ where m and n are from 2 to 100. In some embodiments, n is from 5 to 50, or from 10 to 20. Specific examples of n include 2, 3, 4, 5, 10, 15, 20, 25, 30, 40, 50, 60, 70, 80, 90, 100, and ranges between any two of these values. In some embodiments, n is 15. In some embodiments, n is from 5 to 50, or from 10 to 20. Specific examples of n include 2, 3, 4, 5, 10, 15, 20, 25, 30, 40, 50, 60, 70, 80, 90, 100, and ranges between any two of these values. In some embodiments, n is 15.

After preparation of the protected metal cluster, it is then mixed with the molecule that is to form the molecular cavity to form the composition of the protected metal cluster partially or fully surrounded by the molecular cavity. For example, where the protected metal cluster is Au@SG, it may be processed with an $\alpha$-, $\beta$-, or $\gamma$-cyclodextrin (CD) molecule to form the cluster composition, $Au_{15}$@CD. In one embodiment, the Au@SG precipitate is dissolved in aqueous solution and mixed with CD and excess GSH. The $Au_{15}$@CD cluster composition may be collected from the solution by any known method of separation. Such separation may include centrifugation in some embodiments.

In another aspect, a device is provided which includes any one of the above compositions deposited on a substrate. Suitable substrates include, but are not limited to $SiO_2$, glass, conducting glass, quartz, silicon or functionalized polymers. For example, in one embodiment, the substrate is a thin layer chromatography (TLC) plate coated with a $SiO_2$ stationary phase. In other embodiments, the substrate is a chitosan, a carbon nanotube, activated carbon, alumina, or the like. Such substrates may be sequestered on a surface, or the substrate may be a powder or suspension. In some embodiments, the cluster compositions are uniformly coated on the substrate. In some embodiments, the cluster compositions are coated on the substrate in a pattern. The devices coated with the compositions exhibit a solvent- or medium-dependent luminescence as described above for the compositions.

Any solvent may be used to produce luminescence including methanol, ethanol, 2-propanol, water, acetonitrile, acetone, dichloromethane, carbon tetrachloride, chloroform, toluene, hexane or a mixture. As used herein, "solvent" may be a liquid solvent or solvent vapors.

In some embodiments, the luminescence of the substrate may be reduced or eliminated when the solvent is removed by either evaporation of the first solvent or exposure to a second solvent. In some embodiments, exposure to a first solvent produces luminescence of a cluster composition coated substrate and exposure to a second solvent quenches the luminescence. In some embodiments, the intensity of the luminescence is a dependant on the concentration of the solvent. In some embodiments, a device which includes a cluster composition coated substrate may be used to monitor or identify solvent vapors in the air. The cluster composition may also be used for the selective detection of metal ions as described in Example 8.

Useful information about a product may be contained in a label including the cluster compositions. In some embodiments, a labeling system is provided having a substrate coated with the cluster compositions in a pattern and the pattern is luminescent when exposed to solvents. The labeling system may also include a detection system or means for detecting the pattern on the substrate, or it may be observed visually. The pattern on the substrate may include letters, numbers, symbols, pictures or barcodes that can capture information. The substrate may be attached to currency, financial and legal documents, shipping containers, electronics, medical device, pharmaceutical packaging, packaging on consumer items, biological compounds or other items that should be labeled. For example, the composition may be used to label an article or an object, either with a physical label, or through direct application of the composition to form a label. In some embodiments, the label is invisible to naked eye, but when exposed to a substance, such as a solvent liquid or vapor, the luminescence of the composition is altered, and the label may be visualized.

The detection system or "means for detecting" may be a device that can capture the luminescent pattern including a camera, a UV-Vis detector, a scanner, and the like. As used herein, "coating" of the cluster compositions is understood to include attachment, embedment or other means of binding or association.

In some embodiments, the cluster composition is used in a method for authentication. The cluster composition may be coated on an object in a particular pattern where the authenticity of the object is encoded in the pattern. When the object is exposed to a solvent, the pattern becomes luminescent and the luminescence intensity is reduced when the solvent is removed. In some embodiments, the pattern will be detected with a device such as a camera, UV-Vis detector or the human eye upon contact with the solvent, but the pattern is not detectable, or it is invisible to the naked eye in the absence of the solvent.

In some embodiments, the object may be any item that may need authentication such as currency, financial or legal document, a shipping container, an electronic object, medical device, pharmaceutical packaging, an envelope, packaging or other item. In some embodiments, authenticity of the object will be verified by checking the presence or absence of the pattern of luminescence. Thus, in one embodiment, a method of authentication includes exposing a patterned coating to a solvent, where the patterned coating includes a composition as described above. The method also includes detecting the patterned coating. In such methods, the coating is luminescent when exposed to the solvent and is not luminescent when the solvent is removed; and the patterned coating encodes the authenticity of an object to which the coating is applied. The method may also then include verifying the authenticity of the object. Such authentications may include the patterned coating being in the form of letters, numbers, symbols, pictures, or barcodes. Thus, the verification may be based upon coding, a standard message, or the like.

As used herein, the following definitions of terms shall apply unless otherwise indicated.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, "thiols" are compounds with an "SH" functional group represented by R—SH where R may be H, an alkyl, or aryl group.

Alkyl groups include straight chain, branched chain, or cyclic alkyl groups having from 1 to 20 carbon atoms or, in some embodiments, from 1 to 12, 1 to 8, 1 to 6, or 1 to 4 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above. Where the term haloalkyl is used, the alkyl group is substituted with one or more halogen atoms.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Cycloalkyl groups further include mono-, bicyclic and polycyclic ring systems, such as, for example bridged cycloalkyl groups as described below, and fused rings, such as, but not limited to, decalinyl, and the like. In some embodiments, polycyclic cycloalkyl groups have three rings. Substituted cycloalkyl groups may be substituted one or more times with, non-hydrogen and non-carbon groups as defined above. However, substituted cycloalkyl groups also include rings that are substituted with straight or branched chain alkyl groups as defined above. Representative substituted cycloalkyl groups may be mono-substituted or substituted more than once, such as, but not limited to, 2,2-, 2,3-, 2,4- 2,5- or 2,6-disubstituted cyclohexyl groups, which may be substituted with substituents such as those listed above.

Aryl, or arene, groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

In general, "substituted" refers to a group, as defined above (e.g., an alkyl or aryl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, carbonyls(oxo), carboxyls, esters, urethanes, thiols, sulfides, sulfoxides, sulfones, sulfonyls, sulfonamides, amines, isocyanates, isothiocyanates, cyanates, thiocyanates, nitro groups, nitriles (i.e., CN), and the like.

The present technology, thus generally described, will be understood more readily by reference to the following example, which is provided by way of illustration and is not intended to limit the present technology.

EXAMPLES

Example 1

Synthesis of Au@SG. To a 50 mL methanolic solution (0.5 mM) of $HAuCl_4.3H_2O$, 1.0 mM GSH was added (1:2 molar ratio, total volume of methanol was 50 mL). The mixture was cooled to 0° C. in an ice bath for 30 minutes. An aqueous solution of $NaBH_4$ (0.2 M, 12.5 mL), cooled to 0° C., was injected rapidly into the above mixture under vigorous stirring. The mixture was allowed to react for another hour. The resulting precipitate was collected and washed repeatedly with methanol through centrifugal precipitation. Finally, the Au@SG precipitate was dried and collected as a dark brown powder. The size of Au@SG particles was in the range of 2-3 nm.

Example 2

Cyclodextrin assisted synthesis of $Au_{15}$ clusters. The above nanoparticles (50 mg) were dissolved in 40 mL of de-ionized water containing 1.6 mole of GSH and $2.2 \times 10^{-4}$ mole of cyclodextrin (the three CD molecules were used separately). The mixture was heated at 70° C. for 48 hours.

The completion of the reaction was monitored by checking the red emission of the cluster under UV light. Intense red emission from the sample indicates the formation of the desired cluster. The entire solution was centrifuged at 5000 rpm for 10 minutes. The whitish brown precipitate of Au(1)thiolate was discarded. The supernatant was then transferred to a plastic vial and freeze dried to obtain a brown powder with intense red emission in the solid state. The same method was used for all the three CD molecules (α-, β-, and γ-cyclodextrin) resulting in three separate cluster products. The material was washed twice with ethanol to remove excess GSH. Analysis was done with energy dispersive analysis of X-rays (EDAX). The sample becomes a gel if the solution is allowed to dry in air.

Figure 2:
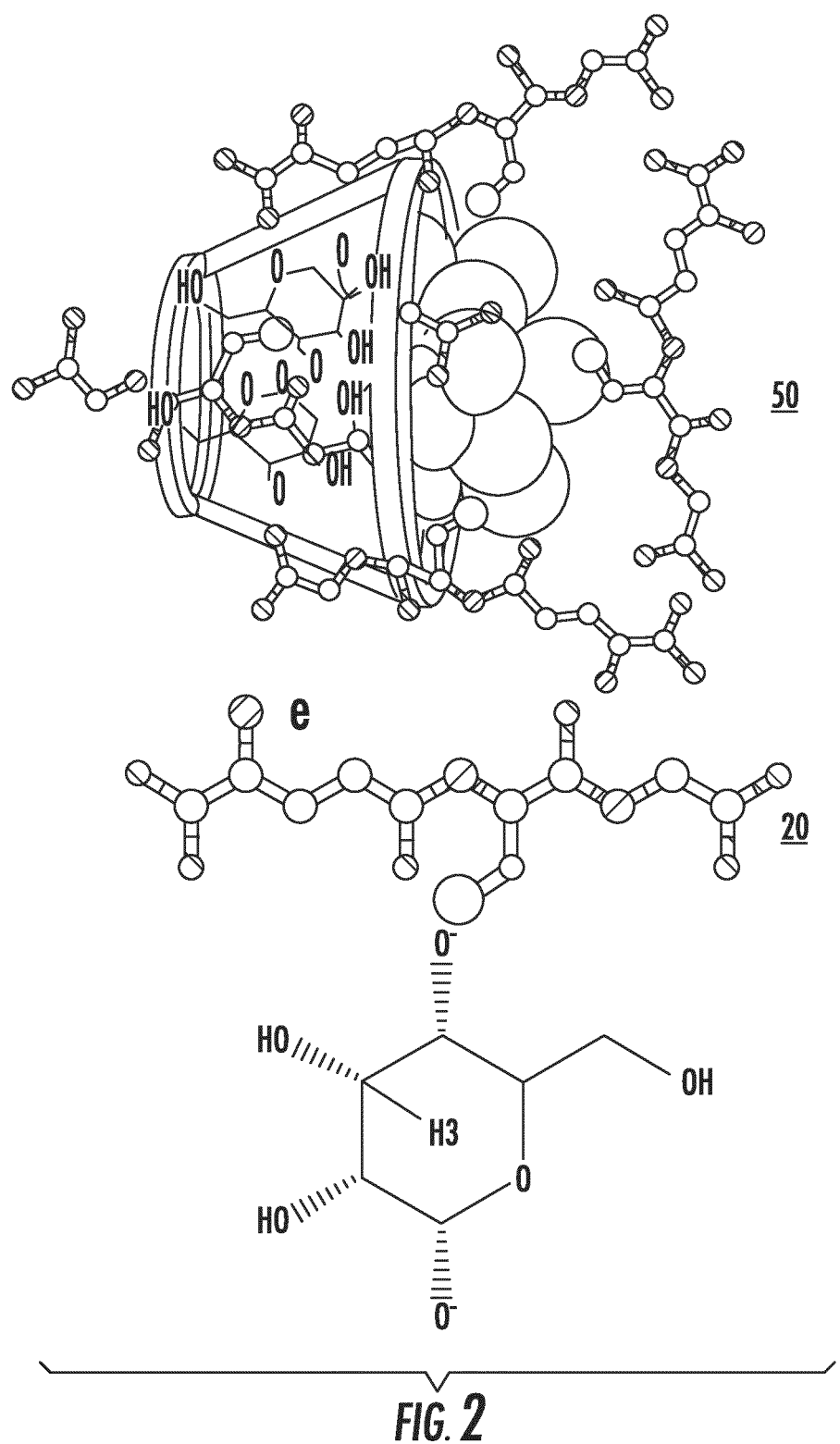
FIG. 2 is a schematic showing the interaction of the SG ligand of the cluster with the CD molecule, according to one embodiment.

FIG. 1 is a schematic of the process for synthesizing some embodiments of the cluster compositions. A Au nanoparticle 10 interacts with one or more protector molecules 20. In some embodiments, the protector molecules are glutathione (-SG) ligands. The Au cluster 10 and the -SG ligand 20 form the Au@SG particle 25. The Au@SG clusters are then mixed with a molecular cavity 30, which may be one or more cyclodextrin (CD) molecules, in the presence of reduced glutathione molecules (GSH) 40. As shown in FIG. 1, various cluster compositions may form during this process including—the Au cluster is partially or wholly surrounded by one CD molecule as in 50, which is an illustration of an $Au_{15}SG_{13}@CD$ cavity. It is believed that the -SG ligand 20 interacts with the CD molecules 30 (partially shown) in the cluster composition 50 as shown in FIG. 2A. In particular, the proton 'e' of the -SG ligand 20 interacts with the 'H3' proton of the CD molecule 30. This was confirmed by 2D $^1$H NMR (ROESY) of $Au_{15}@\alpha CD$, which showed cross peaks for the H3 and e protons. $^1$H NMR of $Au_{15}@\alpha CD$ suggests that the -SG ligands near the surface of the cluster compositions are in two different environments—inside or outside the CD molecules. In addition, the -SG peaks are shifted from the peak for the parent GSH suggesting that there are no free GSH molecules.

Example 3

UV-Vis spectra were recorded using a Perkin Elmer Lambda 25 spectrophotometer. The experimentally obtained intensities in absorbance, as a function of wavelength [I(W)], have been converted to energy-dependent values [I(E)] using the expression $I(E)=I(W)/(\partial E/\partial W)\alpha I(W)\times W^2$, where ∂E/∂w represents the Jacobian factor. The photoexcitation and luminescence studies were done using a NanoLog HORIBA JOBINYVON spectrofluorimeter with a 100 W xenon lamp as the excitation source, at a scan speed of 240 nm/sec. Band pass for both excitation and emission monochromators was kept at 5 nm. Metal ion detection was studied at ppm concentrations. Acetates ($Cu^{2+}$ and $Hg^{2+}$), nitrates ($Ag^{1+}$, $Cd^{2+}$ and $Zn^{2+}$) and chlorides ($Fe^{3+}$) were used for metal ion detection studies. XPS measurements were done using an Omicron Nanotechnology spectrometer with polychromatic Al $K_\alpha$ X-rays (hv=1486.6 eV). At least ten spectra in the desired binding energy range were collected and an average was taken. The samples were spotted as drop cast films on the sample stub and dried under vacuum. X-ray flux was adjusted to reduce the beam induced damage of the sample. The energy resolution of the spectrometer was set at 1.1 eV, at a pass energy of 50 eV. Binding energy (BE) was calibrated with respect to C1s at 285.0 eV. Luminescence transients were measured and fitted using a commercially available spectrometer (Lifespec-ps) from Edinburgh instrument, U.K. (80 ps instrument response function (IRF)). $^1$H NMR and 2D $^1$H NMR (ROESY) spectra were measured with a 500 MHz Brüker Advance III spectrometer operating at 500.13 MHz for $^1$H NMR and equipped with a 5 mm triple-resonance PFG probe. Solutions were made in 99.98% $D_2O$ (Aldrich) and sealed immediately. The signal of the solvent served as the reference for the field-frequency lock. All experiments were performed at a temperature of 25° C. unless specified. Standard Bruker pulse programs (Topspin 2.1) were employed throughout. The 1D spectra were acquired with 32 K data points. The data for phase sensitive ROESY experiments were acquired with a sweep width of 5600 Hz in both dimensions. For each spectrum, 16 transients of 2048 complex points were accumulated for 256 $t_1$-increments and a relaxation delay of 2 s was used. A CW spin lock mixing time of 200 ms was employed. Prior to Fourier transformation, zero filling to 2K×2K complex points was performed, and apodized with a weighted function (QSINE) in both dimensions. All the data were processed on a HP workstation using Topspin 2.1 software. Mass spectrometric studies were conducted using an electrospray (ESI-MS) system, 3200 Q-TRAP LC/MS/MS (Applied Biosystems). Samples of 15 ppm concentration, taken in 1:1 water/methanol mixture were electrosprayed at a flow rate of 10 µL/min and ion spray voltage of 5 kV. Circular dichroism studies were measured using a JASCO J-810 circular dichroism spectropolarimeter. Limit of detection (LOD) of GSH in circular dichroism is approximately 0.1 mg/mL. The optical polarization image was measured using a Nikon Eclipse LV100 POL polarizing microscope. Dynamic light scattering (DLS) measurements were carried out with Nano-S Malvern-instrument employing a 4 mW He—Ne laser (λ=632.8 nm) equipped with a thermostated sample chamber. All the scattered photons were collected at 173° scattering angle. The scattering intensity data were processed using the instrumental software to obtain the hydrodynamic diameter ($d_H$) and the size distribution of the scatterer in each sample.

Example 4

Dynamic light scattering (DLS) measurements were performed to understand the size of the cluster compositions in solution. DLS measurements were carried out with Nano-S Malvern-instrument employing a 4 mW He—Ne laser (λ=632.8 nm) equipped with a thermostated sample chamber. All the scattered photons were collected at 173° scattering angle. The scattering intensity data were processed using the instrumental software to obtain the hydrodynamic diameter ($d_H$) and the size distribution of the scatterer in each sample.

The hydrodynamic diameter of the cluster compositions were observed to be 3-4 nm, which implies the presence of one cluster per CD molecule with water of hydration (see 50 in FIG. 1).

Although the structure of $Au_{15}$ core is not available from single crystal XRD studies, calculations suggest it to have a $C_{2v}$ symmetric, shell-like flat cage structure with a pointed tip. It is possible that a part of the core or monolayers can penetrate into the CD cavity. The inner core diameter is in the range of 0.6-0.9 nm for α, β or γ CDs, respectively, sufficiently large enough to partially accommodate $Au_{15}$ cluster compositions.

The nature of the metal core in these cluster compositions was confirmed by XPS analysis. XPS measurements were done using an Omicron Nanotechnology spectrometer with polychromatic Al $K_\alpha$ X-rays (hv=1486.6 eV). At least ten spectra in the desired binding energy range were collected and an average was taken. The samples were spotted as drop cast films on the sample stub and dried under vacuum. X-ray flux was adjusted to reduce the beam induced damage of the sample. The energy resolution of the spectrometer was set at 1.1 eV, at a pass energy of 50 eV. Binding energy (BE) was calibrated with respect to C1s at 285.0 eV. The $4f_{7/2}$ and $4f_{5/2}$ BEs of Au in all these cluster compositions appear at 85.2 and 89.2 eV.

The S 2p, N 1s and C 1s core level spectra of these cluster compositions were also measured. The Au/S atomic ratio measured from XPS is 1.150, which is in agreement with a composition of $Au_{15}S_{13}$ (theoretical value is 1.1538). The $Au_{15}$ core reported is with 13 -SG ligands. The S 2p occurs at a slightly higher BE (163.1 eV) than typical thiolates (~162.0 eV) suggesting that the -SG protection is intact. The N 1s spectrum shows two peaks at 399.5 eV and 401.3 eV BE, indicating the presence of —NH and —$NH_3^+$, respectively.

Example 5

Figure 3A:
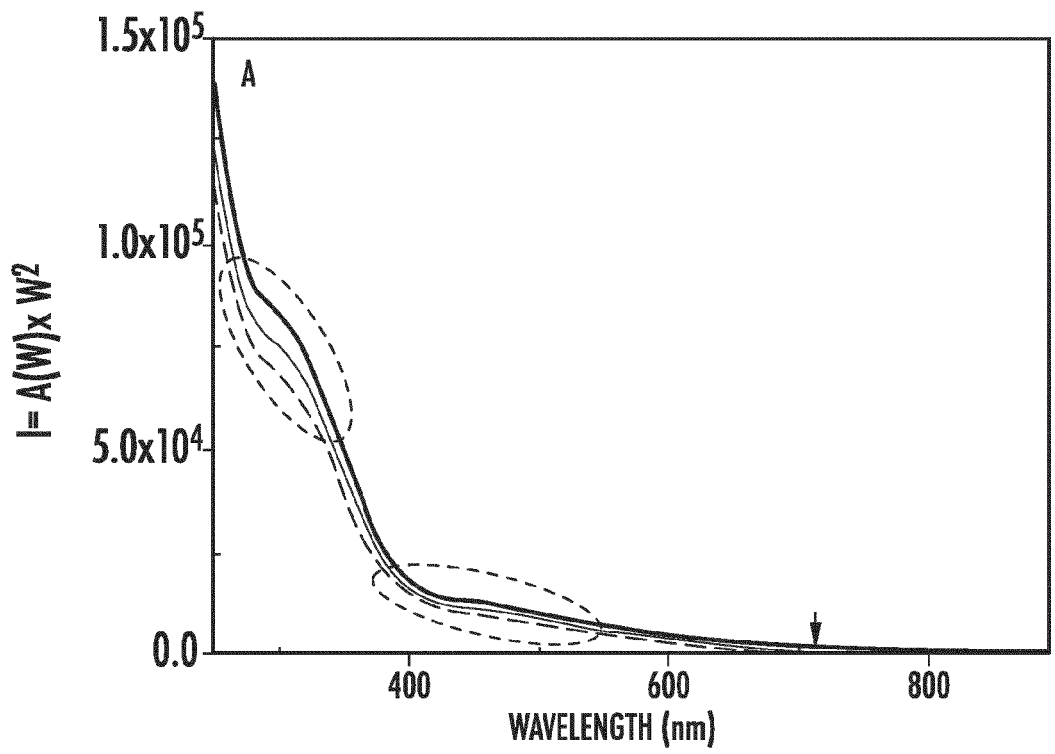
FIG. 3A is the UV-Vis spectra of $Au_{15}@\alpha CD$, $Au_{15}@\beta CD$ and $Au_{15}@\gamma CD$ clusters, according to the examples.

Three samples of cluster compositions—$Au_{15}@\alpha CD$; $Au_{15}@\beta CD$; $Au_{15}@\gamma CD$ were prepared according to Example 2 each with $\alpha$, $\beta$ or $\gamma$ CDs. FIG. 3A is a UV-Vis spectra of $Au_{15}@\alpha CD$, $Au_{15}@\beta CD$, and $Au_{15}@\gamma CD$. FIG. 3A indicates that the absorption wavelengths for $Au_{15}@\alpha CD$, $Au_{15}@\beta CD$, and $Au_{15}@\gamma CD$ exhibit the same features. The distinct features of the $Au_{15}$ core are indicated by the ellipses. The UV-Vis spectra were recorded using a Perkin Elmer Lambda 25 spectrophotometer. The experimentally obtained intensities in absorbance, as a function of wavelength [I(W)], have been converted to energy-dependent values [I(E)] using the expression $I(E)=I(W)/(\partial E/\partial W) \alpha I(W) \times W^2$, where $\partial E/\partial w$ represents the Jacobian factor.

Figure 3B:
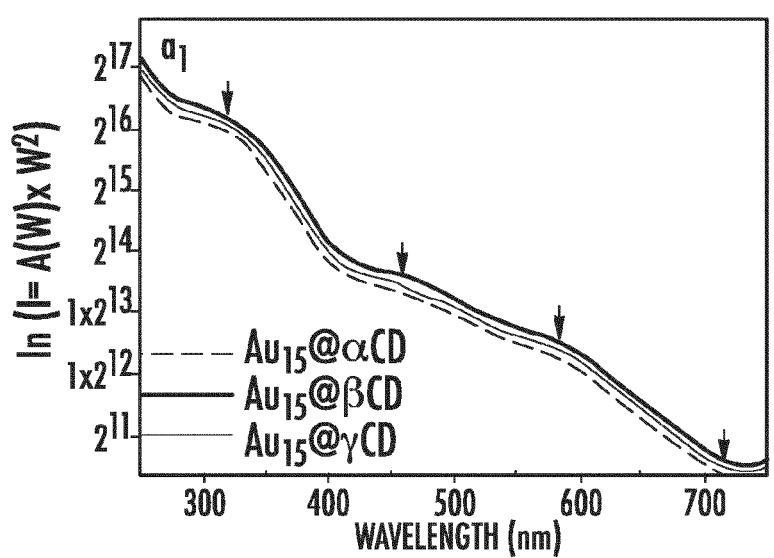
FIG. 3B is the natural logarithm of Jacobian factor-corrected absorbance versus the wavelength of $Au_{15}@\alpha CD$, $Au_{15}@\beta CD$, and $Au_{15}@\gamma CD$, according to the examples.
Figure 3C:
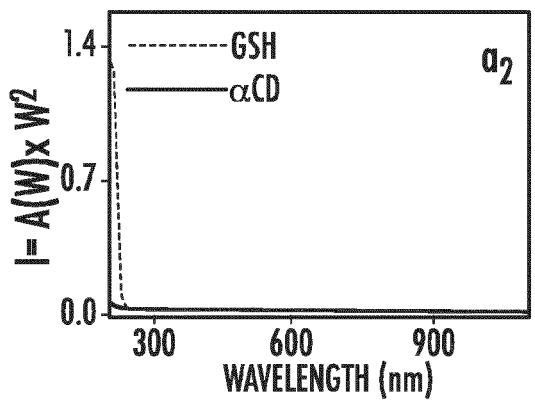
FIG. 3C is a graph of the absorption profiles of pure GSH and $\alpha$-CD, according to the examples.

The three varieties of the quantum composition have characteristic absorption features at 318, 458 and 580 nm, where there are no features for GSH as well as CD. FIG. 3B gives the plot of the natural logarithm of the Jacobian factor versus the wavelength of all the three clusters to show the molecular features more clearly (well-defined absorption features are marked by arrows). FIG. 3C provides the absorption profiles of pure GSH and $\alpha$-CD.

Figure 3D:
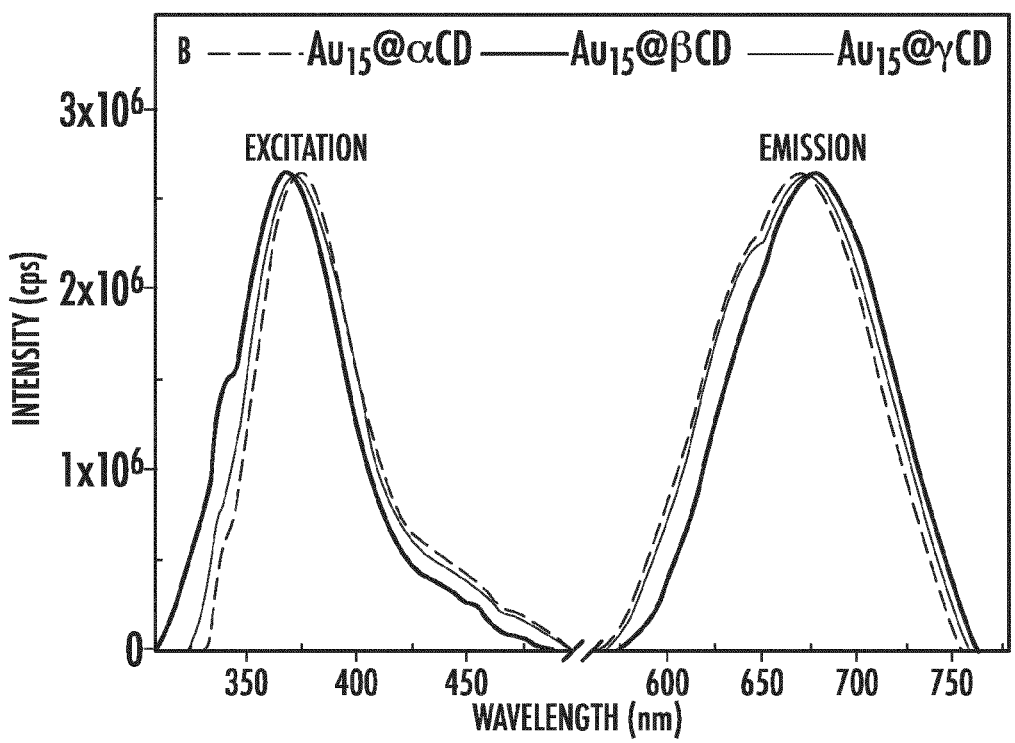
FIG. 3D is a graph of the luminescence spectra of three of the quantum compositions—$Au_{15}@\alpha CD$; $Au_{15}@\beta CD$; $Au_{15}@\gamma CD$, according to the examples.

FIG. 3D is the luminescence spectra of quantum compositions $Au_{15}@\alpha CD$, $Au_{15}@\beta CD$, and $Au_{15}@\gamma CD$. The photoexcitation and luminescence studies were done using a NanoLog HORIBA JOBINYVON spectrofluorimeter with a 100 W xenon lamp as the excitation source, at a scan speed of 240 nm/sec. Band pass for both excitation and emission monochromators was kept at 5 nm. The samples were excited at 375 nm and the emission was observed at 690 nm. These values are consistent with reported numbers for such as $Au_{22}$, $Au_{23}$, and $Au_{10}$.

Lifetime values of the clusters were obtained by numerical fitting of the luminescence at 690 nm. They are 0.029 ns (83.50%), 1.50 ns (5.90%), 14.80 ns (2.60%) and 181 ns (8.0%) for $Au_{15}@\alpha CD$; 0.071 ns (76.6%), 1.15 ns (11.8%), 11.10 ns (4.5%) and 163 ns (7.1%) for $Au_{15}@\beta CD$ and 0.024 ns (84.7%), 1.23 ns (7.6%), 13.90 ns (3.0%) and 172 ns (4.7%) for $Au_{15}@\gamma CD$. The fast lifetime component is present in several clusters investigated so far which also show an extremely slow component with reduced weight. For example, the $Au_{22}$ system shows a fast life time component of 0.05 ns (86.50%) and a slow component of 141.80 ns (3.40%). The quantum yields of the cluster compositions were approximately 6.7% ($Au_{15}@\alpha CD$), 6.5% ($Au_{15}@\beta CD$) and 7% ($Au_{15}@\gamma CD$) at room temperature, using ethidium bromide as the reference. In comparison to other similar clusters such as $Au_{22}$ (4%) and $Au_{23}$ (1.3%), the quantum yield for the cluster compositions here are substantially larger.

Figure 4A:
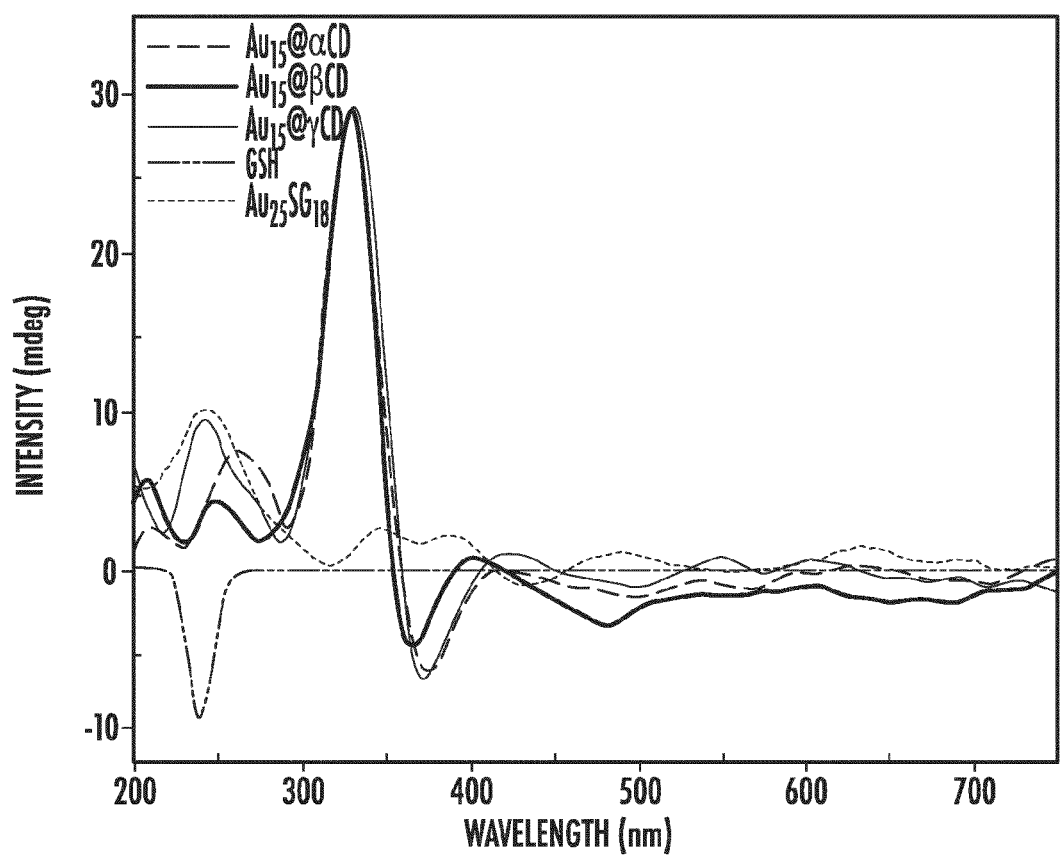
FIG. 4A is the circular dichroism spectra of $Au_{15}@\alpha CD$, $Au_{15}@\beta CD$ $Au_{15}@\gamma CD$ clusters along with pure GSH and $Au_{25}SG_{18}$, according to the examples.

FIG. 4A shows circular dichroism spectra for the cluster compositions with $\alpha$, $\beta$ and $\gamma$-CDs. Circular dichroism was measured using a JASCO J-810 circular dichroism spectropolarimeter. Limit of detection (LOD) of GSH in circular dichroism is approximately 0.1 mg/mL. In addition, the spectra for pure GSH another cluster $Au_{25}SG_{18}$ have been included in FIG. 4A as a comparison. GSH is a chiral compound with a negative Cotton peak around 237 nm. The absence of this peak in the $Au_{25}SG_{18}$ cluster and the cluster composition suggest that there is no free GSH.

Figure 4B:
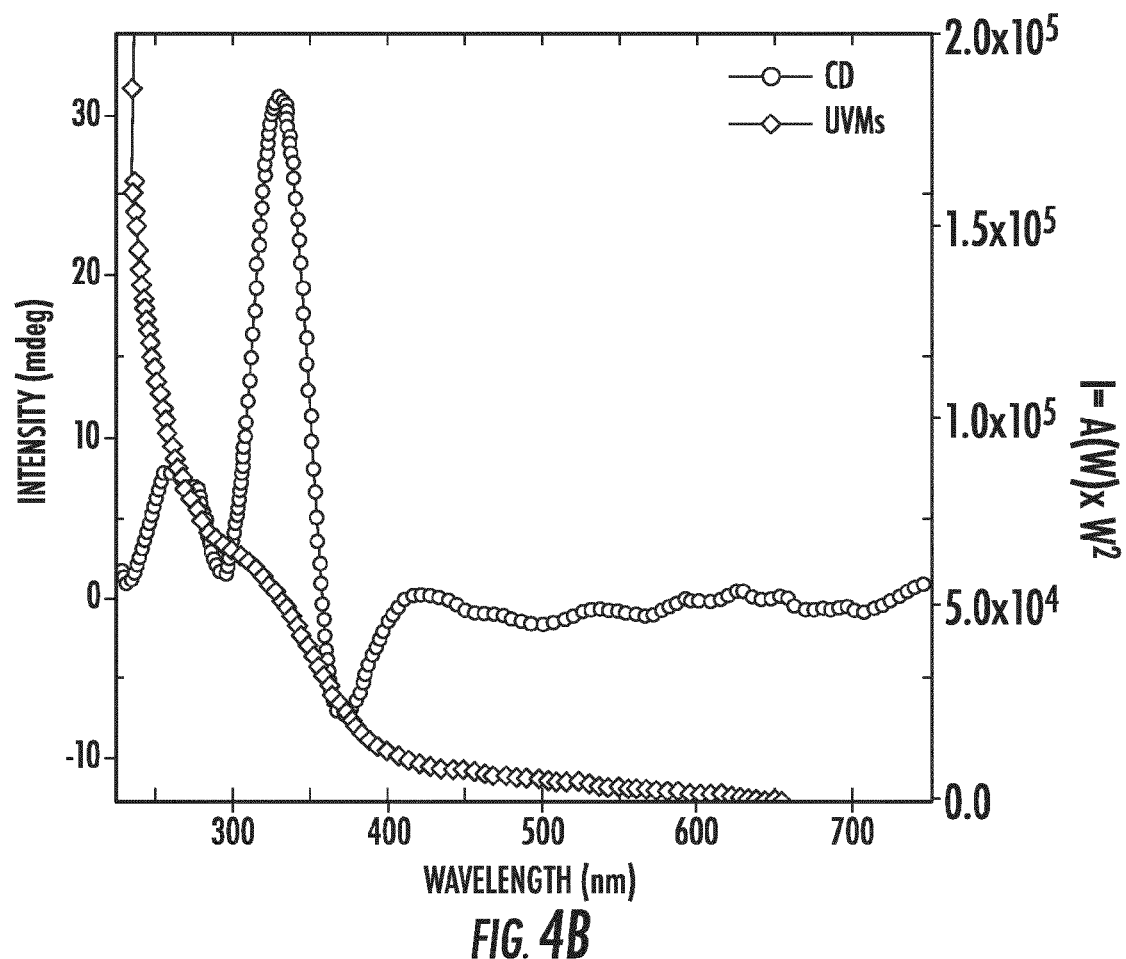
FIG. 4B shows the combined plot of absorption and circular dichroism (CD) spectra for $Au_{15}@\alpha C$, according to the examples.

As seen in FIG. 4A, the spectrum of the cluster compositions are different from the spectra for the $Au_{25}SG_{18}$ cluster. FIG. 4A suggests that the cluster compositions exhibit induced circular dichroism. The cluster compositions have a positive Cotton peak around 330-380 nm and a negative Cotton peak around 400-455 nm, which may be attributed to the cluster core. FIG. 4B shows the combined plot of absorption and circular dichroism (CD) spectra for $Au_{15}@\alpha CD$.

Example 6

$Au_{15}@\alpha CD$ was stored in a glass vial for 24 hours and the solution was decanted. The glass vial retains a thin layer of cluster composition even with water sonication for 10 minutes. The cluster compositions remain intact and coat on the glass. Although not bound by theory, it is believed that the cluster compositions may bind with the Si—OH of the glass.

A thin layer chromatography (TLC) plate with bulk $SiO_2$ coating was coated with the cluster composition solution of two different concentrations. The plate with the high and low concentration of cluster composition shows red and rose emissions, respectively, under UV light. The cluster composition-coated TLC plate can be used as a substrate for checking the solvent dependency of photoluminescence. The emission from the TLC plate was collected with 375 nm excitation. Then 2-propanol was sprayed over the plate using a sprayer. Immediately after spraying, emission was collected using the same excitation. There is a slight enhancement of the luminescence intensity. The plate was then allowed to dry completely resulting in the reversal of luminescence. A few other alcohols such as methanol and ethanol were sprayed. Luminescence increased in the order, propanol<methanol~ethanol. However, exposure of water on the TLC plate drastically reduced the luminescence intensity. No shift in the emission wavelength was observed. The emission data are presented in FIG. 5.

Figure 5:
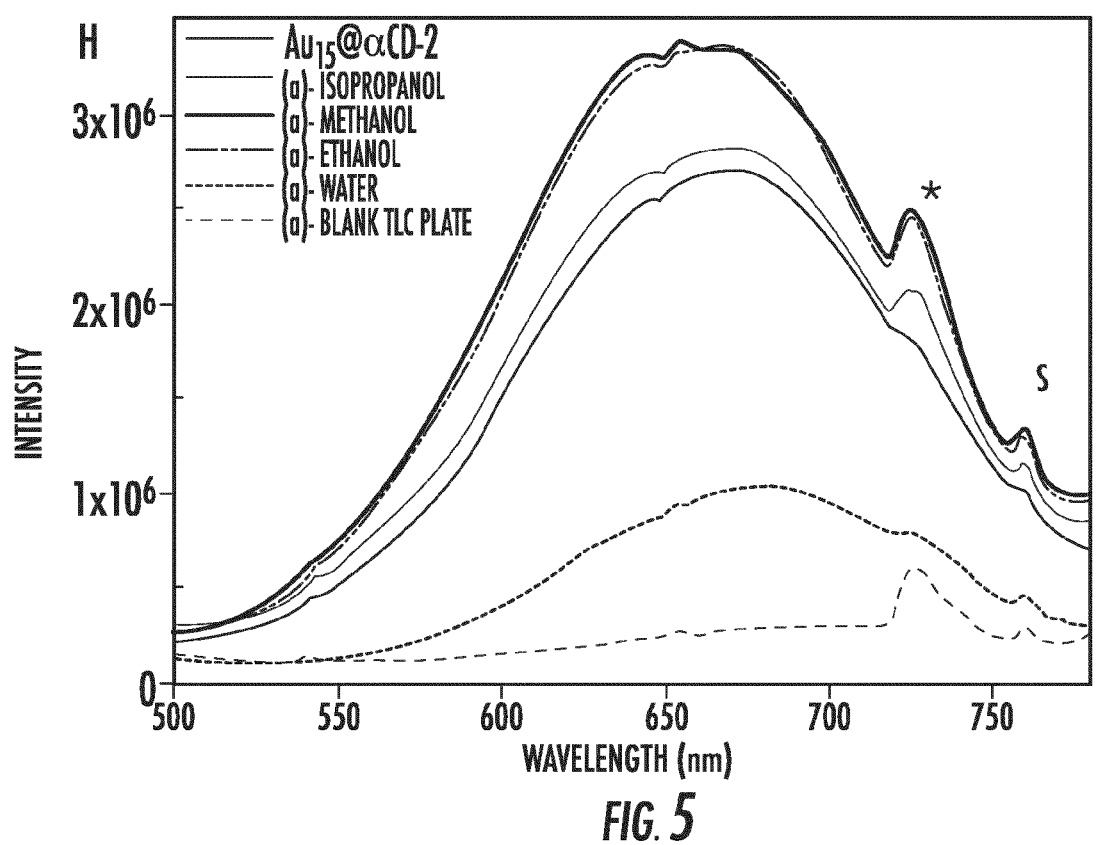
FIG. 5 is a luminescence spectra of a TLC plate coated with Au@CD, when contacted with various solvents, according to the examples.

The solvent dependency of emission is currently believed to be attributed to hydrogen bonding of the solvent molecules with ligands on the cluster. As a result, the non-radiative rate of decay will reduce and this will enhance the emission. In addition to the cluster composition emission, FIG. 5 shows a peak at 725 nm which is attributed to the emission from the TLC plate. Asterisk (*) corresponds to regions where higher order line of the grating mask the spectrum and dollar ($) corresponds to the emission coming from $SiO_2$.

The solvent dependency of the emission was used to write letters on the TLC plate. In this approach, the TLC plate was coated with a given concentration of the cluster composition. In one embodiment, a low concentration of cluster composition was used to coat the TLC place such that the emission intensity is weak (and the plate is rose in color). When solvent contacts the plate, it enhances luminescence intensity and the solvent exposed regions appear with brighter luminescence. As the solvent evaporates, the parent luminescence reappears bringing the plate to the original state.

Example 7

Figure 6A:
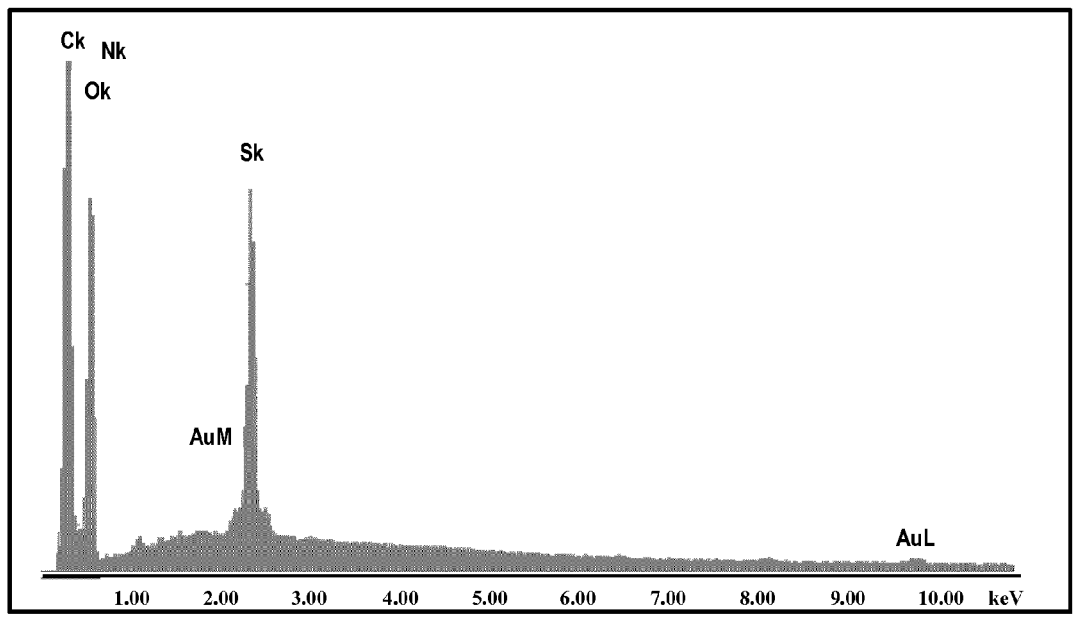
FIG. 6A is an EDAX spectrum of the gel formed by cluster compositions, according to the examples.
Figure 6B:
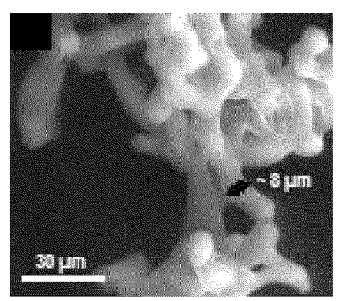
FIG. 6B is an SEM image of the gel formed by the cluster compositions, according to the examples.
Figure 6C:
FIG. 6C is an EDAX mapping of the gel using $Au_n$, corresponding to SEM image in 6A, according to the examples.
Figure 6D:
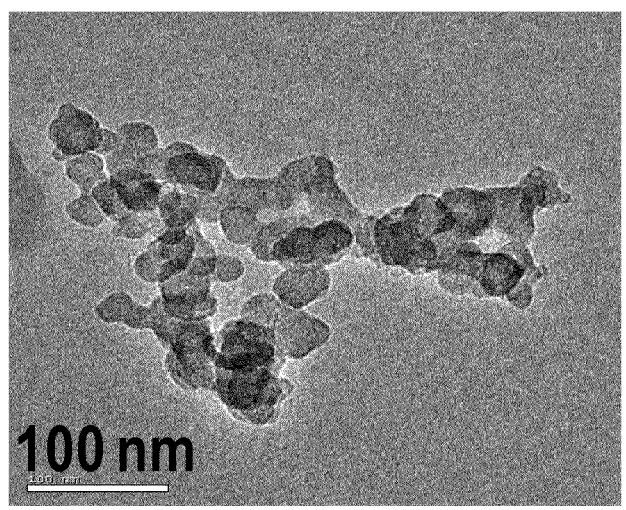
FIG. 6D is a TEM image of the gel shows the self assembly and fiber-like morphology, according to the examples.

At higher concentrations, QCs have a tendency to form a gel-like material with intense emission. Self assembly of the CD and -SG molecules at high concentration may result in gelation. This appears to be the first report of a gel using QCs. These materials were analyzed by SEM and HRTEM. The microstructure of the gel is composed of fibers of ~8 μm diameter (FIG. 6B). In order to study the spatial distribution of gold in the gels formed by QCs, elemental mapping was carried out using energy dispersive analysis of X-rays (EDAX). FIG. 6A shows the EDAX spectrum collected from the gel shown in FIG. 6B. EDAX mapping was done using Au Ma and the image is given in FIG. 6C. The detailed structure of the fibers was examined by TEM (FIG. 6D). The isolated clusters are not seen in TEM, as mentioned before. Both in TEM and SEM, a fiber-like morphology is observed. Cyclodextrins and their derivatives have been extensively used as host molecules in supramolecular chemistry. Inclusion complexes (ICs) of CDs and guest molecules may result in supramolecular nanostructures (nanogels). Such complexes may find applications in drug delivery and diagnosis, especially in view of the low metallic content of the cluster and its high solubility in water in conjunction with luminescence.

Example 8

Figure 7A:
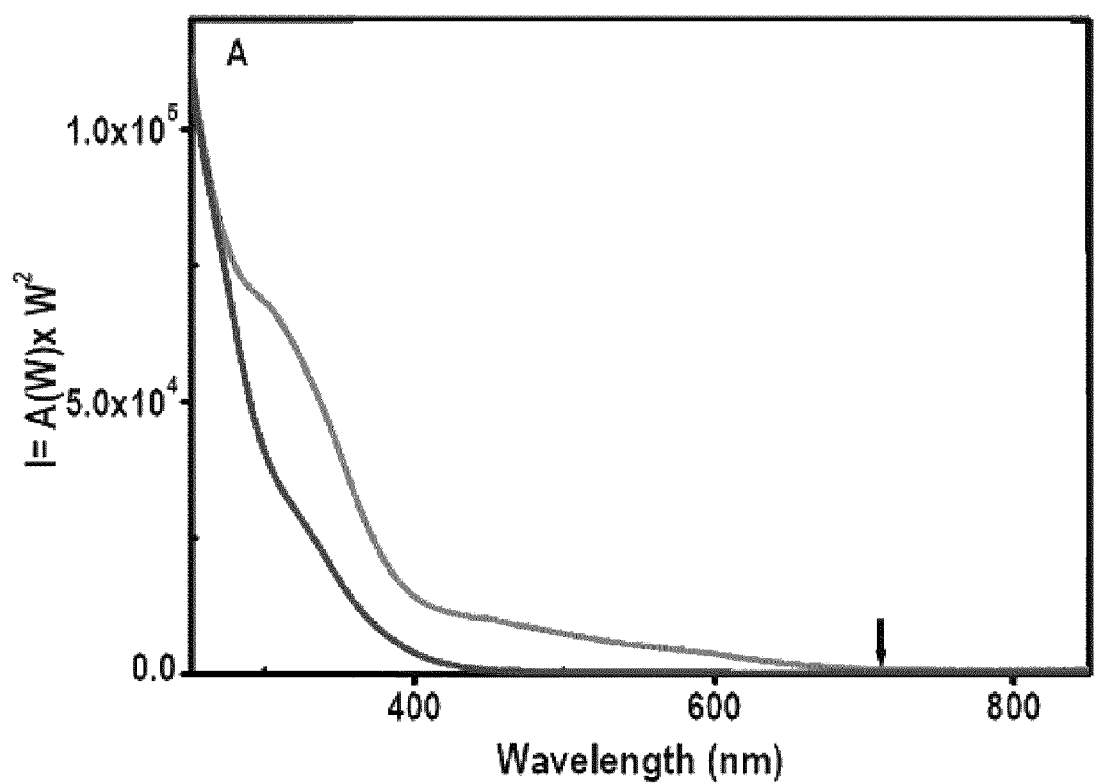
FIGS. 7A & 7B are UV-Vis spectra of $Au_{15}@\alpha CD$ cluster before and after the addition of $Cu^{2+}$, according to the examples.
Figure 7B:
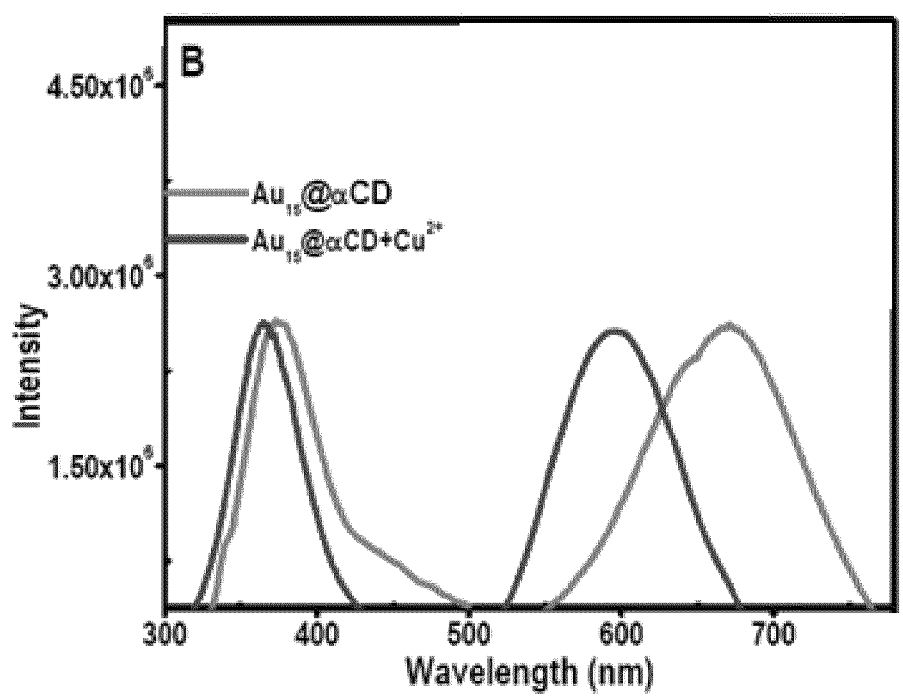

The cluster composition may be used for the selective detection of metal ions such as $Cu^{2+}$. An aqueous solution of the cluster composition was prepared. Metal ions were added individually under UV light. With the addition of $Cu^{2+}$ ions, there was a drastic change in luminescence—disappearance of red emission followed by the emergence of yellow emission (within a few minutes). The UV-Vis and luminescence spectra of cluster solution before and after addition of $Cu^{2+}$ are given in FIGS. 7A and 7B. Even after the addition of $Cu^{2+}$, the molecular absorption features are still intact (FIG. 7A), suggesting that the cluster composition is stable. But by looking into the PL spectra of cluster composition before and after the addition of $Cu^{2+}$, a drastic change of emission maximum was observed (a blue shift of ~100 nm).

EQUIVALENTS

While certain embodiments have been illustrated and described, it should be understood that changes and modifications can be made therein in accordance with ordinary skill in the art without departing from the technology in its broader aspects as defined in the following claims.

The use of the terms "a" and "an" and "the" and similar referents in the context of describing the elements (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

Other embodiments are set forth in the following claims.

What is claimed is:

1. A quantum cluster comprising:
   $Ag_m$, $Au_n$, or $Ag_mAu_n$, wherein m and n are independently from 2 to 100;
   one or more glutathione molecules bound to the $Ag_m$, $Au_n$, or $Ag_mAu_n$; and
   a cyclodextrin, calixarene, or crown ether partially or wholly surrounding the one or more glutathione molecules bound to the $Ag_m$, $Au_n$, or $Ag_mAu_n$;
   wherein the cyclodextrin is selected from the group consisting of unsubstituted α-cyclodextrin, unsubstituted β-cyclodextrin, and unsubstituted γ-cyclodextrin.

2. The quantum cluster of claim 1 comprising the cyclodextrin partially or wholly surrounding the one or more glutathione molecules bound to the $Ag_m$, $Au_n$, or $Ag_mAu_n$.

3. The quantum cluster of claim 2, wherein at least two cyclodextrins each partially surround the one or more glutathione molecules bound to the $Ag_m$, $Au_n$, or $Ag_mAu_n$.

4. The quantum cluster of claim 1 further comprising an alcohol, water, acetonitrile, acetone, dichloromethane, carbon tetrachloride, chloroform, toluene, hexane, or a combination of any two or more thereof.

5. The quantum cluster of claim 1 further comprising water.

6. A quantum cluster comprising:
Au$_n$, wherein n is independently from 2, 3, 5, 10, or 15;
one or more glutathione molecules bound to the Au$_n$; and
a cyclodextrin, calixarene, or crown ether partially or wholly surrounding the one or more glutathione molecules bound to the Au$_n$;
wherein the cyclodextrin is selected from the group consisting of unsubstituted α-cyclodextrin, unsubstituted β-cyclodextrin, and unsubstituted γ-cyclodextrin.

7. The quantum cluster of claim 6 comprising the cyclodextrin partially or wholly surrounding the one or more glutathione molecules bound to the Au$_n$.

8. The quantum cluster of claim 7, wherein two cyclodextrins each partially surround the one or more glutathione molecules bound to the Au$_n$.

9. The quantum cluster of claim 6 further comprising an alcohol, water, acetonitrile, acetone, dichloromethane, carbon tetrachloride, chloroform, toluene, hexane, or a combination of any two or more thereof.

10. The quantum cluster of claim 6 further comprising water.

11. A quantum cluster comprising:
Au$_n$, wherein n is 15;
one or more glutathione molecules bound to the Au$_n$; and
a cyclodextrin partially or wholly surrounding the one or more glutathione molecules bound to the Au$_n$;
wherein the cyclodextrin is selected from the group consisting of unsubstituted α-cyclodextrin, unsubstituted β-cyclodextrin, and unsubstituted γ-cyclodextrin.

12. The quantum cluster of claim 11, wherein two cyclodextrins each partially surround the one or more glutathione molecules bound to the Au$_n$.

13. The quantum cluster of claim 11 further comprising an alcohol, water, acetonitrile, acetone, dichloromethane, carbon tetrachloride, chloroform, toluene, hexane, or a combination of any two or more thereof.

14. The quantum cluster of claim 11 further comprising water.

15. A device comprising:
a plurality of the quantum clusters of claim 1 deposited on a substrate comprising SiO$_2$, glass, conducting glass, quartz, silicon, a functionalized polymer, chitosan, a carbon nanotube, activated carbon, or alumina.

16. The device of claim 15, wherein the plurality of quantum clusters are uniformly coated on the substrate.

17. A device comprising:
a plurality of the quantum clusters of claim 6 deposited on a substrate comprising SiO$_2$, glass, conducting glass, quartz, silicon, a functionalized polymer, chitosan, a carbon nanotube, activated carbon, or alumina.

18. The device of claim 17, wherein the plurality of quantum clusters are uniformly coated on the substrate.

19. A device comprising:
a plurality of the quantum clusters of claim 11 deposited on a substrate comprising SiO$_2$, glass, conducting glass, quartz, silicon, a functionalized polymer, chitosan, a carbon nanotube, activated carbon, or alumina.

20. The device of claim 19, wherein the plurality of quantum clusters are uniformly coated on the substrate.

* * * * *